March 26, 1940.   O. E. ANDRUS   2,194,781
WATER PURIFICATION
Filed Dec. 3, 1936   3 Sheets-Sheet 1

INVENTOR.
Orrin E. Andrus
BY
ATTORNEY.

March 26, 1940.   O. E. ANDRUS   2,194,781
WATER PURIFICATION
Filed Dec. 3, 1936   3 Sheets-Sheet 2
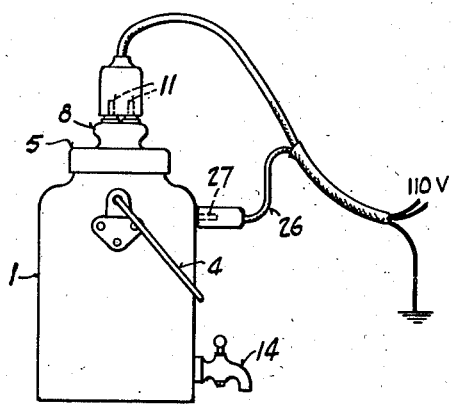
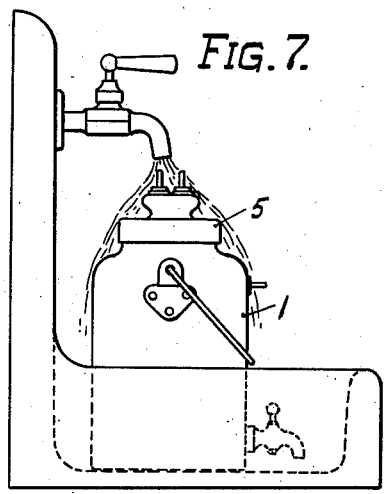
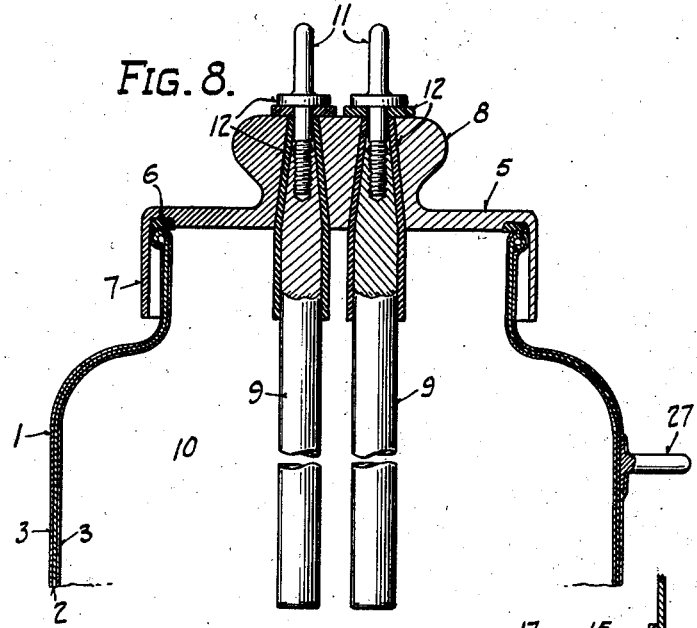
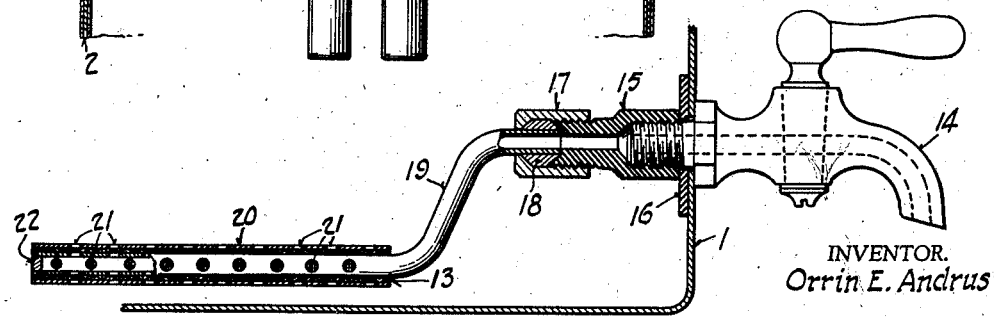
INVENTOR.
Orrin E. Andrus
BY
ATTORNEY.

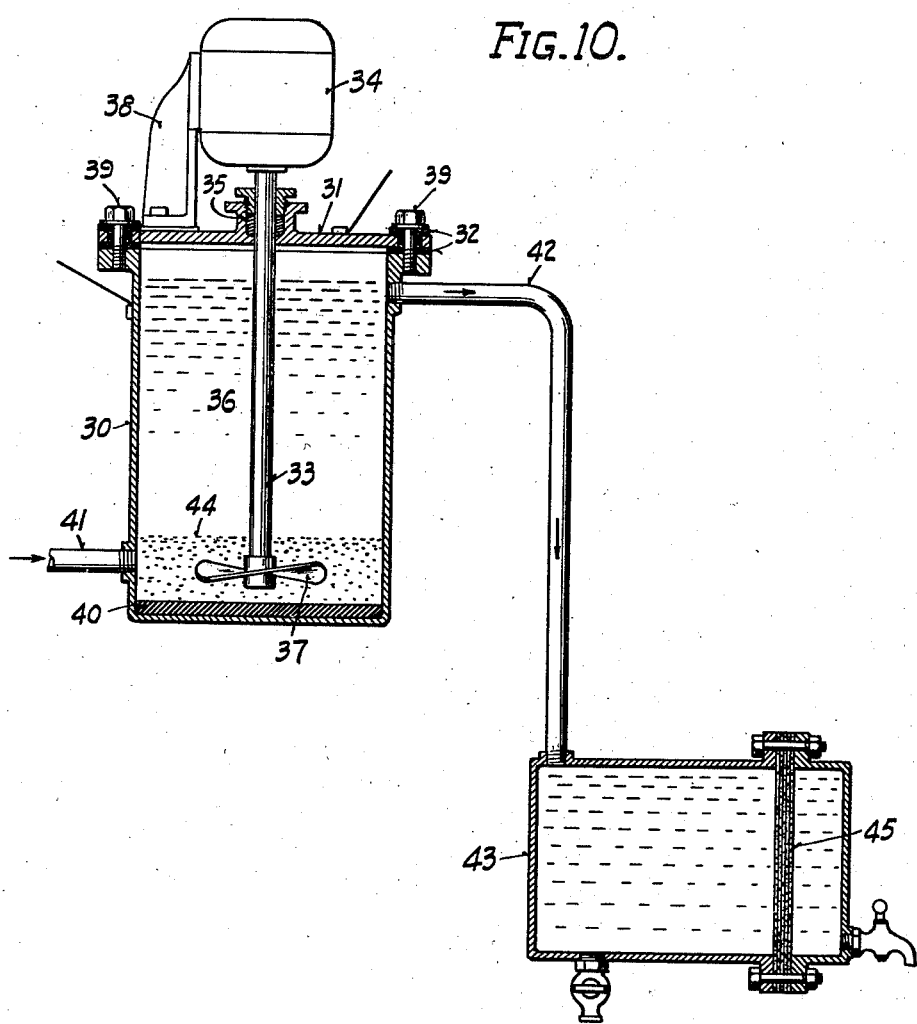

Patented Mar. 26, 1940

2,194,781

UNITED STATES PATENT OFFICE 2,194,781

WATER PURIFICATION

Orrin E. Andrus, Altadena, Calif.

Application December 3, 1936, Serial No. 114,020

6 Claims. (Cl. 204—25)

This invention relates to an apparatus for purifying drinking water, and is particularly adapted for use in the home, restaurant and office.

The object of the invention is to provide an improved apparatus for purifying water by means of coagulating chemicals produced by electrolysis within said apparatus. The present invention relates particularly to apparatus for repeatedly or continuously accomplishing purification of water without inconvenience from deposits forming on the electrodes.

The invention and its objects may be more readily understood by reference to the accompanying drawings in which:

Fig. 6 is a view of the apparatus showing the water undergoing the electrolytic operation for the formation of a purifying coagulum;

Fig. 7 is a view of the apparatus showing the water undergoing a forced cooling operation;

Fig. 8 is a detailed view of the electrode assembly of the apparatus;

Fig. 9 is a detailed view of the screen tube assembly of the apparatus; and

Fig. 10 is a vertical cross-section of a modified embodiment of the invention adapted for continuous purification.

Figure 1:
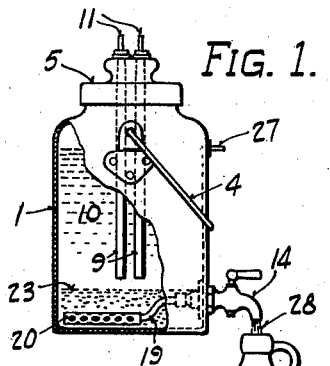
Figure 1 is an embodiment of the invention showing it in the filtering operation, a portion of the container being shown in section.

Figs. 1 to 9 inclusive illustrate an apparatus for batch treatment in which the filter bed serves as a scouring medium for an electrode. The container 1 is preferably made of an electrically, non-conductive material, as vitreous enameled iron, or of glass. As illustrated in Fig. 8, it may be made of sheet iron 2, coated internally and externally with vitreous enamel 3. A bail 4 may be provided for convenience in handling the filter during the various operations making up a filtering cycle. The filter cover 5 may be made of composition, glass, vitreous enameled metal or metal. A rubber gasket 6 is provided for the purpose of making a water-tight seal when desired. An apron 7 may be provided to prevent the entrance of cooling water into the container 1 during the cooling operation. A knob 8 is convenient as a handle to the cover 5.

Two spaced electrodes 9 are suspended within the water space 10 of the container. The electrodes are supported by the cover and are secured thereto by threaded terminal pins 11 and insulated from the cover by insulating bushings 12. One or both of these electrodes are preferably made of pure aluminum. They are of appreciable surface area and are spaced only a small distance apart to reduce the resistance of the circuit through the water. One-half inch diameter electrodes spaced three-fourths inch between centers are satisfactory.

A screen tube 13 connects with a faucet 14 as illustrated in Fig. 9. The faucet 14, together with a compression coupling 15 and a washer 16, makes a water-tight seal at the junction with the container 1. The nut 17, together with the packing sleeve 18, makes a tight connection between the tube 19 and the compression coupling 15. The compression coupling 15 and washer 16 may be made of an electrically insulating material to insulate the water, the screen tube 13 and the concentric tubes 19 and 20 from the metal of the container 1 and faucet 14. The concentric tubes 19 and 20 are perforated by a series of aligned holes 21. Screen tube 13 is a cylindrical piece of fine wire cloth held tightly between the tubes 19 and 20 which are compressed one on the other. A plug 22, closing the end of tube 19, is held in place by compression. The screen tube 13 is surrounded with a loose, abrasive filter bed 23 such as sand, carborundum or aluminum oxide. This filter bed may be made of both coarse and fine granules.

Figure 4:
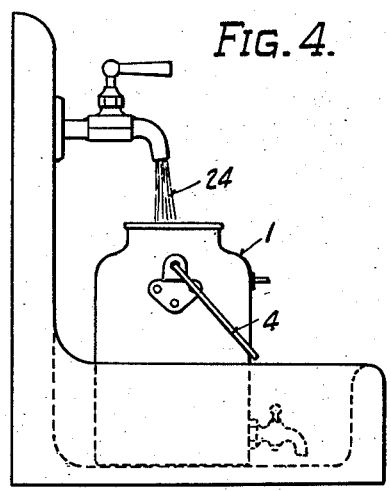
Fig. 4 is a view of the apparatus showing the container being filled with raw water preparatory to the washing or the purifying operations.

Assuming that the apparatus is clean, then the first operation required in the purification of a batch of water is that of filling the container 1 with the raw water 24 to be purified, as illustrated in Fig. 4. By raw water is meant any water which may contain solids in suspension, odors, taste, color, and living organisms which make the water objectionable for drinking purposes or other use.

Figure 5:
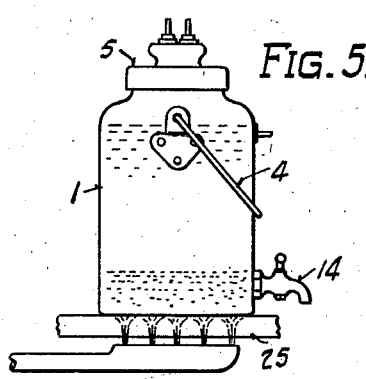
Fig. 5 is a view of the apparatus showing the water undergoing a heating operation.

It is frequently desirable to sterilize the water by heat, as well as to purify it. Assuming that heating is desired, then the apparatus, previously charged with water, is placed on a stove 25 or other source of heat, as shown in Fig. 5. It is sometimes convenient to have an electric heating element directly attached to the bottom of the apparatus. Sufficient heat may be generated by passage of the electric current through the water between the electrodes. The heating operation may be carried out at pressures above atmospheric by using a container adapted for steam pressure. Apparatus for this purpose is disclosed and claimed in my co-pending application Serial No. 112,555 filed November 24, 1936.

The electrolytic formation of a purifying coagulum within the water is accomplished by connecting the electrode terminals with a source of electricity. This may be done preceding, during or following the heating operation if the water is sterilized by heat. The 110 volt A. C. house lighting current has been found very satisfactory for the electrolytic operation. However, the current supply may be any suitable voltage A. C. or D. C. It is preferable when using a metal or vitreous enameled container to connect the metal 2 of the container 1 by means of terminal 27 to a ground lead 28 to eliminate the danger of electric shocks to the operator. The current passing from the electrodes into the raw water electrolyte causes the removal of aluminum from one or both electrodes, and aluminum hydroxide is formed in a state adapted for purifying the water. The electric current is applied for a sufficient time for electrolysis to produce the required amount of purifying coagulum which depends upon the volume and condition of the water. Usually ten to thirty minutes is sufficient. The electrolytic generation of coagulum does not introduce soluble salts into the water as do chemical means of producing coagulum. This is particularly advantageous when purifying water which contains appreciable quantities of impurities. It is sometimes advantageous to add powdered charcoal, particularly in the activated form, to the water to assist the coagulum, especially when odors and colors difficult to remove are encountered.

Figure 2:
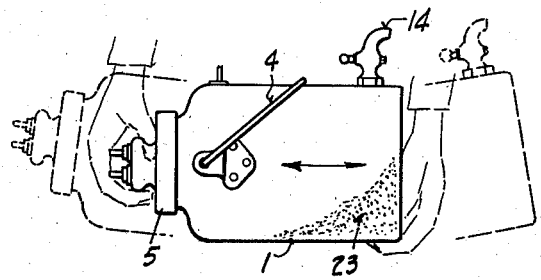
Fig. 2 is a view of the apparatus of Fig. 1 showing the manual agitating operation used when washing the apparatus or when mixing the coagulum with the raw water.

During or following the electrolytic operation, an agitating period is usually advisable to assure contact of the coagulum or coagulum and charcoal with the impurities in the batch of water and to retard or prevent accumulations of deposits on the electrodes. This operation is in general necessary unless a boiling operation is included. When agitation is advisable, the apparatus may be shaken with an end-to-end motion as shown in Fig. 2. It lies within the scope of the invention to use any suitable method of agitation such as by a combined impeller and electrode, by an impeller separate from the electrodes or by a moving container.

Boiling of the batch of water may be substituted for the agitating operation used to disperse the coagulum throughout the water. It is also possible to remove or prevent the accumulation of electrode deposits by simultaneously electrolyzing and boiling water.

If the water has undergone sterilization, the apparatus and contents are usually cooled before the filtering operation is started. However, it is sometimes preferable to filter the water while it is hot. The apparatus can be cooled by air over a period of time, or it can be cooled quickly by partially immersing it or by flowing water over it. The latter method, of flowing cold water over the purifier as shown in Fig. 7, is particularly rapid and convenient when slow air cooling is not permissible. Since it is usually important to prevent the entrance of contaminated cooling water into the treated water, the apron 7 surrounding the cover 5 is provided. After the major portion of the heat has been removed from the apparatus and treated water, this water may be filtered into receptacles and stored in a refrigerator for use as required. It is sometimes preferable to place the entire purifier, with its contents of treated water, into a refrigerator and to filter the cold treated water as required.

During the filtering operation, the coagulum or coagulum and charcoal, with its load of attached impurities, remains on the upper surface of the filter bed while the purified or purified and sterilized water passes through the filter bed into the screen tube 13, and exits from the container through the faucet 14. The layer of coagulum which gathers on the upper surface of the filter bed also aids in filtering out impurities. As the filtered water is withdrawn from the faucet 14, air enters the filter around the loose fitting cover 5. Fig. 1 illustrates the purifier during the filtering operation in which the filtered water 28 is drawn into the receptacle 29.

Figure 3:
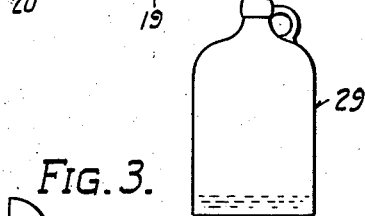
Fig. 3 is a view of the apparatus showing the wash water with suspended impurities being decanted from the container.
Figure 3:
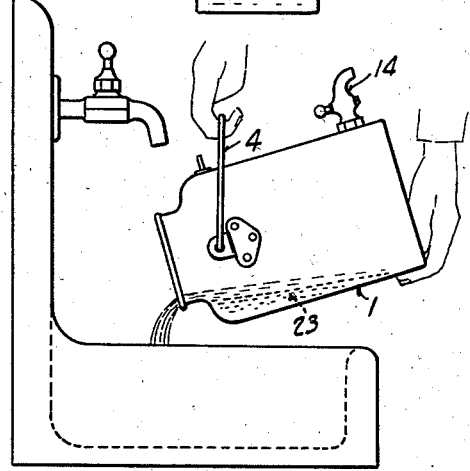

When all of the treated water has been filtered out, the cover is removed and the container partially filled with raw water, as shown in Fig. 4. The purifier is preferably re-covered and grasped in a horizontal position as shown in Fig. 2. The contents are violently agitated by an end-to-end motion to thereby scour deposits from the surfaces of the electrodes and also to suspend the coagulum or coagulum and charcoal with attached impurities. The agitation of the wash water and the abrasive filter bed also serves to disintegrate and suspend fragments of electrode deposit which have become detached from the electrodes, as by the simultaneous operations of boiling and electrolysis. The cover is removed and the water and suspended impurities quickly decanted off, leaving the filter bed within the container as shown in Fig. 3. The operation of washing, as shown by steps in Figs. 4, 2 and 3, may be repeated several times until the decanted wash water is relatively clean. The cycle is now completed and the apparatus is ready to be re-charged for another cycle of purification as shown starting with Fig. 4.

The prevention of electrolysis products from accumulating on the electrodes is very essential to the satisfactory operation of the apparatus. If these deposits are not prevented from accumulating, they gather filth and organisms and eventually drop from the electrodes as relatively large fragments that are apt to remain in the apparatus. Accumulation of deposits on the electrodes may result in the uneven attack of the electrodes and in a waste of time, electricity and electrode metal. This invention prevents the accumulation of deposits on the electrodes either by scouring the electrode surface with a mixture of abrasive material and water or by electrolyzing boiling water. The scouring operation may be accomplished by agitation of the abrasive material with either the water undergoing purification or with the water used for washing the apparatus. The operation used in preventing the accumulation of electrode deposits may be continuous, may be a portion of each batch cycle or may be from time-to-time as found necessary.

Fig. 10 illustrates an apparatus for continuous treatment in which the electrode abrasive is separate from the filter medium. It consists of an electrolyzing container 30, preferably made of heavy aluminum and forming one electrode. A tight fitting cover 31 is insulated from the body of the container by the insulating ring 32. A rotating electrode 33 extends from the motor 34 through the stuffing box 35 into the interior of the electrolyzing container 36. An aluminum impeller 37 is supported on the lower end of the electrode 33. The motor 34 is supported on the cover 31 by bracket 38. The cover 31 is fastened to the flange of the container 30 by insulated bolts 39. An insulating plate 40 of rubber prevents attack of the container bottom by electrolysis.

An inlet 41 for raw water is connected directly to the water system at the existing pressure. An outlet 42 for treated water connects to a filter or filter unit and settling chamber 43. An abrasive granular material 44 is maintained in the electrolyzing chamber 36. A screen may be placed ahead of the outlet 42 to prevent the escape of the abrasive material should agitation be excessive.

In operation, water flows into the opening 41 as rapidly as it is filtered from the filter unit 43. As the raw water enters at inlet 41 it becomes mixed with the abrasive material 44 and is caused to contact the rotating electrode 33 and stationary cylindrical electrode 30. A current flowing between these electrodes through the water causes the formation of a purifying coagulum which is dispersed into the water by the impeller 37. The abrasive material continually scours the electrodes of accumulations of electrolysis products. The coagulum-bearing water passes out of the electrolyzing container through the outlet 42, leaving the abrasive material within the electrolyzing container. The treated water with its load of coagulum is then settled and filtered or filtered directly through any conventional filter 45.

The aluminum electrodes can be used repeatedly or continuously until reduced in cross section to the degree that a renewal is advisable. It lies within the scope of the claims to use aluminum, aluminum alloys or equivalent materials for electrodes. The electrodes may be two or more in number and may be stationary or movable. They may be of any suitable size or shape as long as a sufficient portion of their surfaces can be scoured of electrolytic deposits by the abrasive material. The carborundum, aluminum oxide, sand or other equivalent abrasive filter bed or material may be used repeatedly or continuously with replenishment from time-to-time for losses. The re-use of purifying coagulum can be practiced with or without the further generation of more coagulum during each filtering cycle. It is also within the scope of this invention to use charcoal or other insoluble absorbing agents in conjunction with the electrolytically generated coagulum.

Following are specific definitions of some of the terms used in the claims: "means for applying a sterilizing heat to said container and contents" refers to a surface of the container from which the water receives heat, to an internal heater or to the heating effect of the electric current passing through the water between the electrodes. "Means for producing relative motion of the abrasive material and electrodes" refers to a moving surface of the container, to a moving electrode or to an impeller which is capable of giving motion to the water and abrasive material. "Water contacting surfaces," in conjunction with abrasive material, refers to the internal container walls, to the electrode surfaces, or to the impeller surfaces which, when in motion, transmit motion to the water and abrasive material.

Various embodiments of the invention may be employed within the scope of the accompanying claims.

I claim:

1. A portable compact unit for use in purifying water comprising a container having therein a loose granular filter bed of abrasive material possessing electrode scouring characteristics when agitated with water, and electrodes supported in said container and at least one of which produces a purifying coagulum in the water when said water is electrolyzed, said container having an exit for the filtered water located beneath the surface of said filter bed and means in connection with said exit to prevent the escape of the filter bed granules with the filtered water.

2. A portable compact unit for use in purifying water comprising a container having therein a loose granular filter bed of abrasive material possessing scouring characteristics when agitated with water, and an aluminum electrode with means for relatively moving the same in contact with the water and abrasive filter bed, said electrode being positioned in the water space of said container, said container having an exit for the filtered water located beneath the surface of said filter bed with openings restricted to prevent exit of the filter bed granules and an exit for flushing out suspended coagulum and attached impurities.

3. A portable compact unit for use in sterilizing and purifying a batch of water comprising a container having therein a loose abrasive filter bed, electrodes supported in said container and at least one of which produces a purifying coagulum in the water when said water is electrolyzed, and means for applying a sterilizing heat to said container and its contents, said container having an exit for the filtered water located beneath the surface of said filter bed and means in connection with said exit to prevent the escape of the filter bed granules with the filtered water, an inlet for air to enter said container during the filtering operation, means for producing relative motion of the abrasive material and the electrodes with respect to each other while they are immersed in water, and an exit for flushing out suspended coagulum and attached impurities.

4. A portable compact unit for use in sterilizing and purifying small batches of water for drinking purposes comprising a container adapted for manual shaking for the purpose of agitating the water and loose filter bed and having therein a loose granular filter bed of abrasive material possessing scouring characteristics when agitated with water, and electrodes at least one of which forms a purifying coagulum in the water when said water is electrolyzed, said electrodes being supported internally of the container to use the batch of water as electrolyte, a surface of the container being adapted for the application of heat to the container and its contents, and said container having an exit for the filtered water located beneath the surface of said filter bed with restricted openings to prevent exit of the filter bed granules, an opening constituting an inlet for air to enter said container during the filtering operation and an exit for pouring off wash water with suspended coagulum and attached impurities.

5. A portable compact unit for use in purifying water, comprising a container having therein a loose granular filter bed of abrasive material possessing electrode scouring characteristics when agitated with water, and electrodes supported in said container and at least one of which produces a purifying coagulum in the water when said water is electrolyzed, said container having an exit for the filtered water located beneath the surface of said filter bed and means in connection with said exit to prevent the escape of the filter bed granules with the filtered water, and said container having an opening in the top with a cover therefor for filling and washing purposes.

6. An apparatus for purifying water in batches comprising a container for receiving a batch of water to be purified and having a loose granular filter bed, electrodes supported in said container and at least one of which produces a purifying coagulum in the water when said water is electrolyzed by passing a current between said electrodes, said container having an exit for the filtered water disposed beneath the surface of said filter bed and an opening for entrance of water to be purified, and means for boiling the water in said container during electrolysis to sterilize the water and parts of the apparatus in contact therewith and to prevent deposits on the electrodes from interfering with the formation of coagulum.

ORRIN E. ANDRUS.